Dec. 31, 1968     M. A. MESSA     3,419,491

WATER TREATMENT APPARATUS AND METHOD

Filed Oct. 23, 1965     Sheet _1_ of 3

INVENTOR
MATTHEW A. MESSA
BY
Seidel & Gonda
ATTORNEYS.

INVENTOR
MATTHEW A. MESSA
BY Seidel & Gonda
ATTORNEYS.

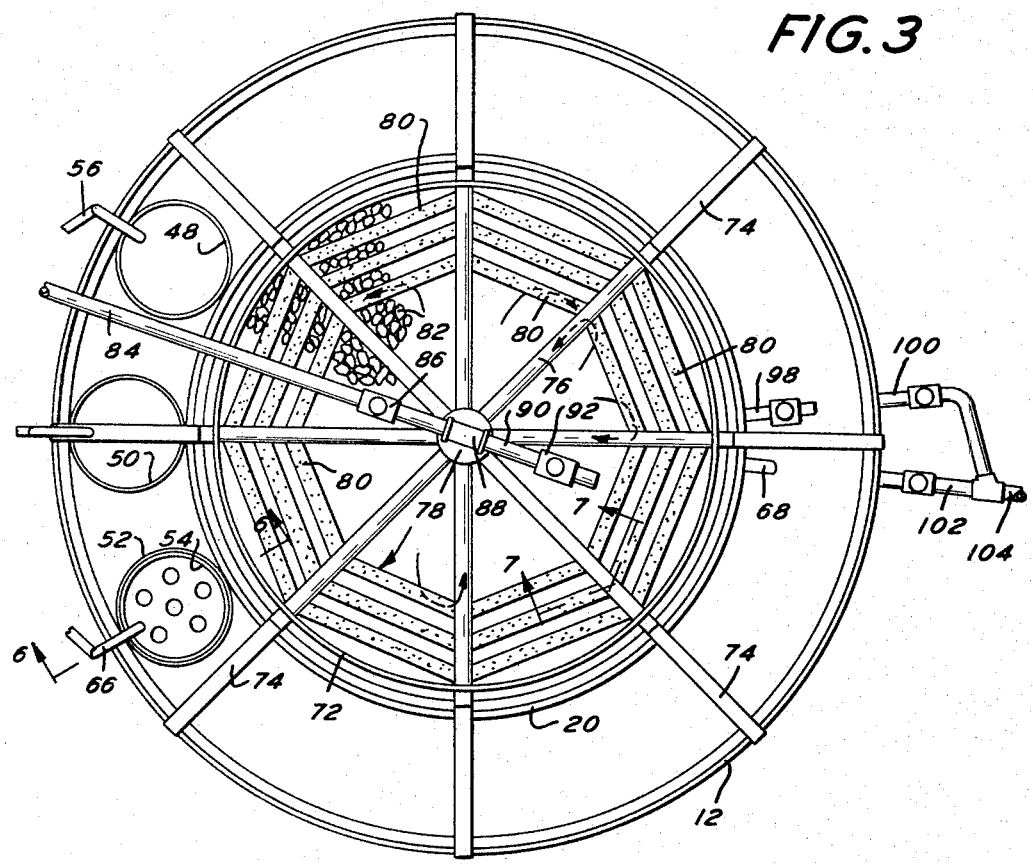
FIG. 3
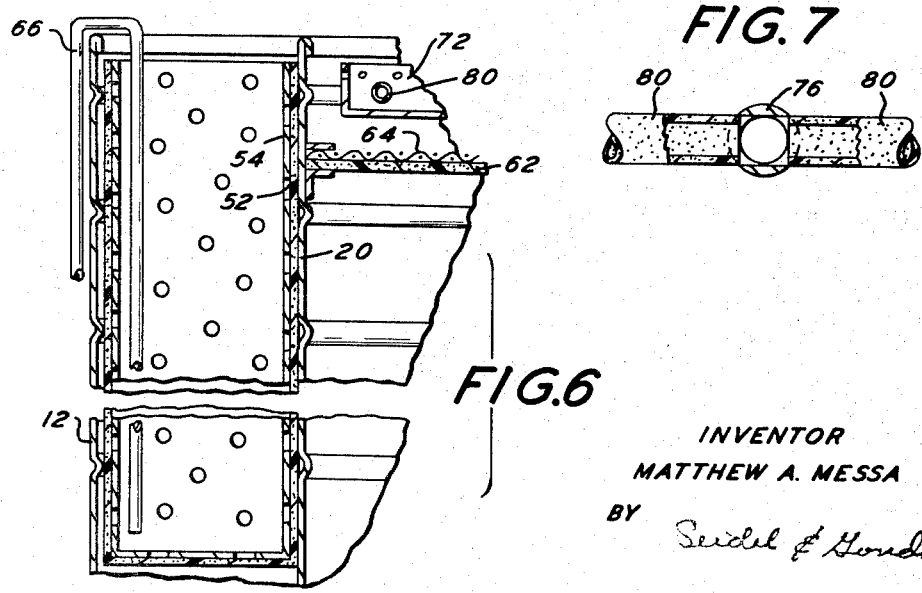
FIG. 7
FIG. 6
INVENTOR
MATTHEW A. MESSA
BY
Seidel & Gonda
ATTORNEYS.

United States Patent Office 3,419,491
Patented Dec. 31, 1968

3,419,491
WATER TREATMENT APPARATUS AND METHOD
Matthew A. Messa, 604 Cedarbrook Apartments,
Wyncote, Pa. 19095
Filed Oct. 23, 1965, Ser. No. 503,567
12 Claims. (Cl. 210—20)

ABSTRACT OF THE DISCLOSURE

Water treatment apparatus and method is disclosed including an upflow clarifier in which a floc blanket will be provided. The floc blanket is prevented from being upset and removed along with tilted water by contact with a porous medium which defines the upper limit of the floc blanket and additionally performs a filtering action. The clarifier is surrounded by a collection chamber which communicates with the clarifier at a location adjacent but below the porous medium. Means are provided for continuously removing clarified water from the sludge collection chamber. A coagulant and a pH correction chemical are introduced into the water at the bottom of the upflow clarifier.

---

This invention relates to water treatment apparatus and a method of treating water. In particular, the present invention relates to apparatus and method for purifying raw liquids containing turbidity, suspended solids, foreign matter, detergents, etc.

The present invention processes raw liquids to purify the same and is to be distinguished from saline conversion units which are constructed to convert salt water to fresh water. The fresh water effluent produced by the apparatus of the present invention can be attained by prior art devices. The prior art devices have a large number of disadvantages or lack the advantages of the present invention.

Prior art water purification devices include electronic or mechanical or pressure controls and circuits. The apparatus of the present invention eliminates these expensive components which require maintenance and add substantially to the cost of the equipment. Prior art devices utilize separately installed underground sludge tanks and separate holding tanks, each of which are eliminated by the present invention. Prior art devices utilize mixing chambers, downcomers, and an agitator within the downcomer, all of which have been eliminated by the present invention. Prior art devices utilizing an upflow clarifier are always subject to having the floc blanket upset which requires a shut-down of the equipment.

The apparatus and method of the present invention have numerous advantages including positive coagulation without upsetting the floc blanket in an upflow clarifier. The apparatus of the present invention does not require continuous surveillance as to the status of the floc blanket to be certain that the same does not upset or bubble over. The present invention provides water purification apparatus which is substantially simpler than that proposed heretofore and substantially more inexpensive while having the same capacity. The apparatus of the present invention does not need a separate sludge tank and can be utilized for longer runs. That is, the apparatus of the present invention can be utilized continuously for periods up to sixty days without shutting down the equipment. The apparatus and method of the present invention can be stopped and started, pulsed, all without substantial set-up time or interference with the floc blanket.

In accordance with the present invention, a water treatment apparatus and method involves the provision of an upflow clarifier within and radially spaced from an outer housing thereby defining an annular sludge collection chamber therebetween. A positive means is provided in the upflow clarifier to define the upper limit for the floc blanket and a means is provided thereabove for removing the effluent from the clarifier. Conduit means are provided for introducing raw liquids to the upflow clarifier. A means is provided to introduce a pH correction chemical into said conduit means. Also, a means is provided for introducing a coagulant into said conduit means. Also, a means is provided for introducing clarified liquids from the sludge collection chamber into said conduit means.

The floc blanket in the upflow clarifier coagulates the small particles of impurities and filters out impurities having a particle size less than about 25 microns. The positive means defining the upper limit of the floc blanket is preferably in the form of a porous substrate capable of filtering out impurities having a particle size greater than 25 microns. The liquids which have been processed through the porous substrate may be considered the effluent for return to a system such as the water system of a laundromat, car wash, etc. If a more pure effluent is desired, the same may be processed through a secondary filter which is conveniently supported above the clarifier. The present invention will enable business establishments such as laundromats and car washes to reduce their water requirements by more than fifty percent while at the same time substantially reduce the cost to local townships and boroughs that will not have to process the spent liquids from such business establishments which are generally discharged into a sewer drain by the establishments. By enabling such business establishments to reuse and recycle the water forming a part of their system, more water will be available for human consumption and other uses, thereby somewhat alleviating water supply shortages.

It is an object of the present invention to provide a water treatment apparatus and method which is simple, inexpensive and reliable.

It is another object of the present invention to provide water treatment apparatus and method having an upflow clarifier which includes means to provide a positive upper limit for a floc blanket.

It is another object of the present invention to provide a water purification apparatus and method wherein a floc blanket is not susceptible to being upset or bubbling over.

It is another object of the present invention to provide a water treatment apparatus and method which provides positive coagulation and eliminates the necessity for separate sludge tanks or holding tanks which are generally installed underground.

It is another object of the present invention to provide a water treatment apparatus and method which is simple to install and maintain while having a run time of up to sixty days.

It is another object of the present invention to provide water treatment apparatus and method which can deliver an effluent having about one part per million of turbidity and about .1 part per million of ABS.

Other objects will appear hereinafter.

For the purpose of illustrating the invention, there are shown in the drawings forms which are presently preferred; it being understood, however, that this invention is not limited to the precise arrangements and instrumentalities shown.

FIGURE 3 is a top plan view of the apparatus of the present invention.

FIGURE 6 is a sectional view taken along the line 6—6 in FIGURE 3.

FIGURE 7 is a sectional view taken along the line 7—7 in FIGURE 3.

Referring to the drawing in detail, wherein like numerals indicate like elements, there is shown in FIGURE 1 a water treatment apparatus designated generally as 10.

Figure 1:
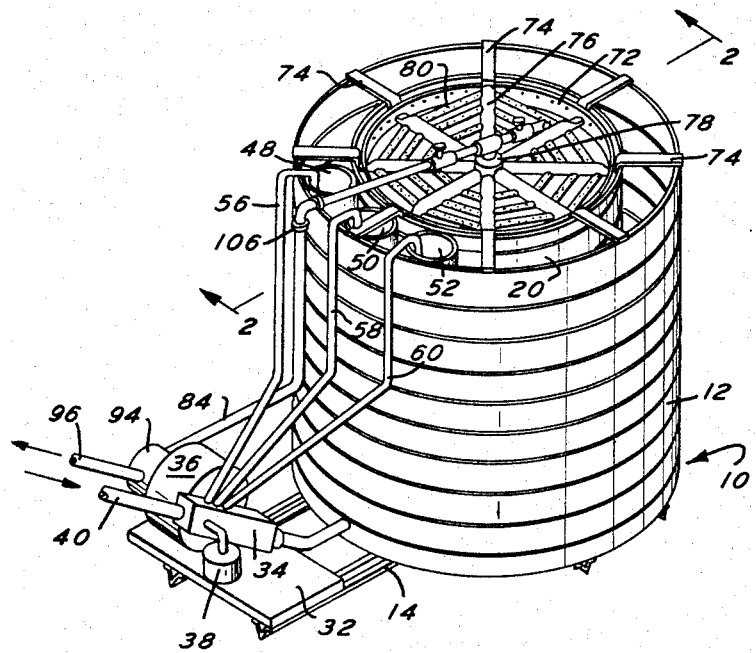
FIGURE 1 is a perspective view of the apparatus of the present invention.

The apparatus 10 includes an outer housing 12 having its bottom wall 16 mounted on a base 14. Base 14 is preferably made from channel iron members so as to space the bottom wall 16 from the supporting surface such as a floor or the like. An upflow clarifier designated generally as 18 is disposed within the housing 12 and spaced radially inwardly therefrom.

The clarifier 18 includes a cylindrical wall 20 merging into a radially inwardly tapered wall 22. The lower edge of wall 22 is hermetically sealed to the bottom wall 16 by any convenient manner, such as welding. Each of the housing 12 and wall 20 are cylindrical in the embodiment illustrated but may be of other configurations and are preferably provided with reinforcement ribs at spaced points therealong as illustrated.

A diffusion chamber 24 is provided within the upflow clarifier 18 adjacent the bottom thereof. The chamber 24 is defined by the bottom wall 16 of the housing 12 and a cup-shaped member 26. Member 26 is disposed upside down so that its base 28 is above the lower edge of the open end which in turn is spaced from the bottom wall 16. The outer periphery of member 26 is fixedly connected to the tapered wall 20 by means of baffles 30 at spaced points therearound.

Figure 4:
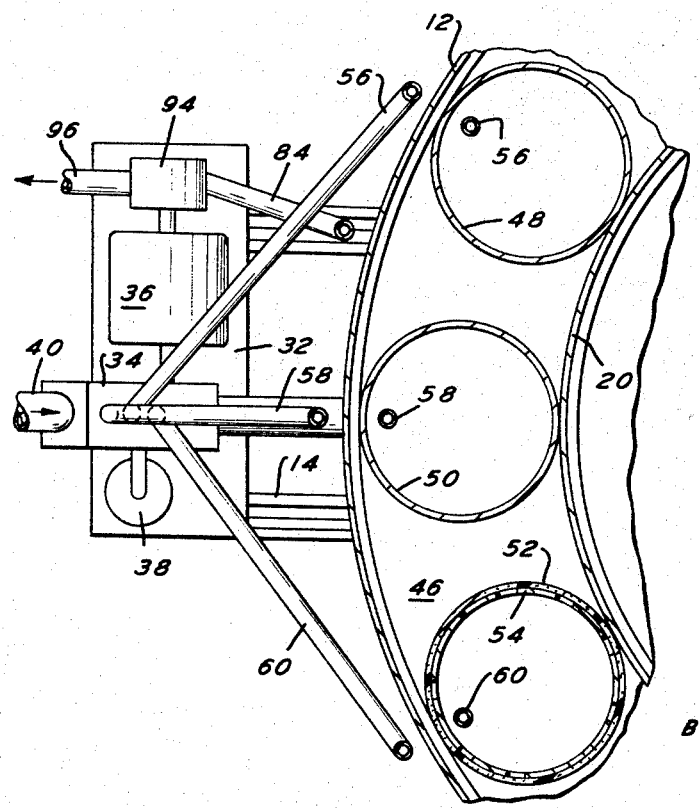
FIGURE 4 is an enlarged sectional view taken along the line 4—4 in FIGURE 2.
Figure 2:
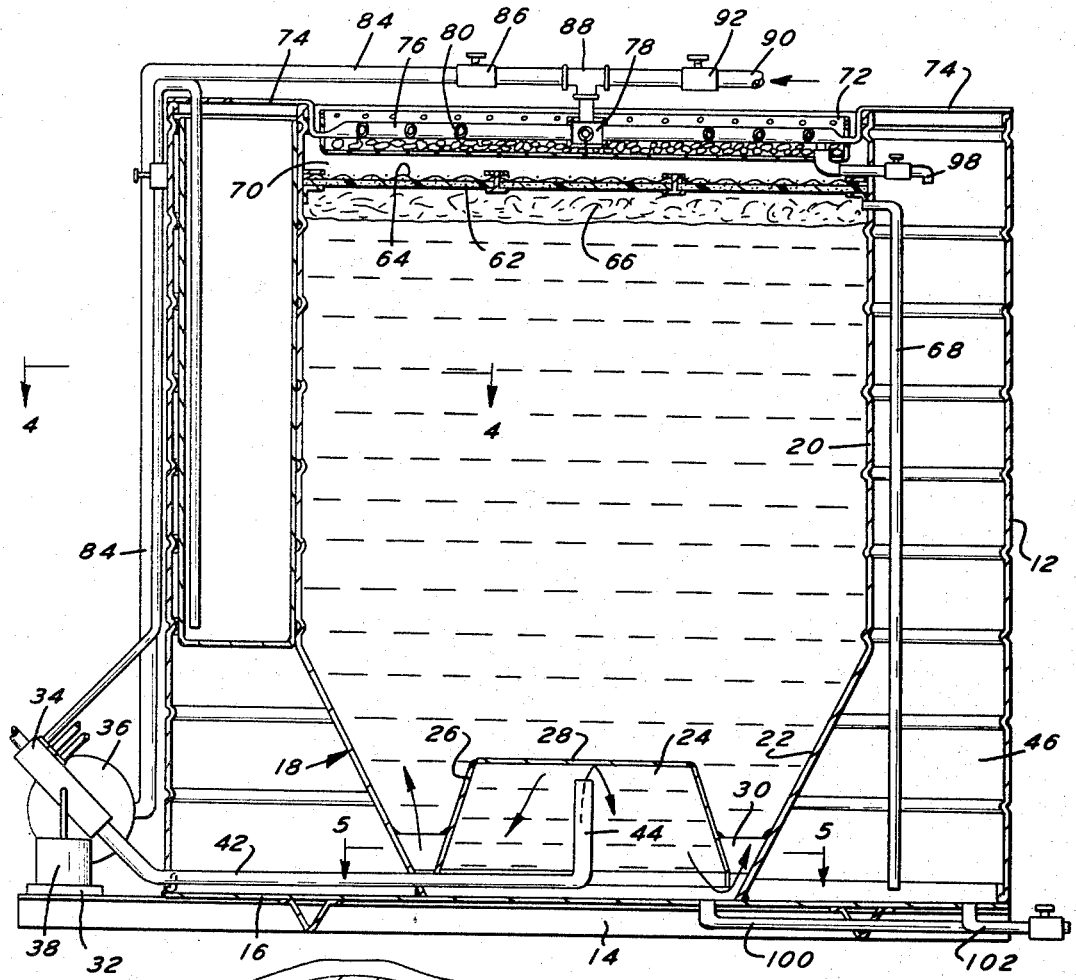
FIGURE 2 is a sectional view taken along the line 2—2 in FIGURE 1.
Figure 5:
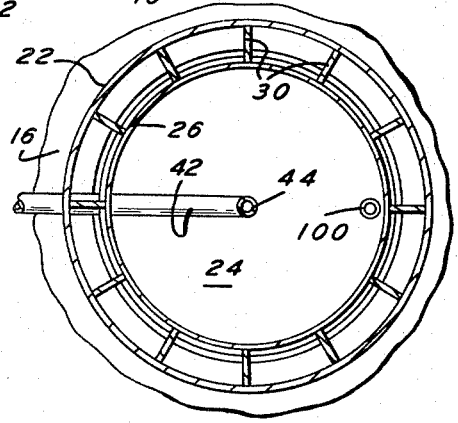
FIGURE 5 is a sectional view taken along the line 5—5 in FIGURE 2.

As shown more clearly in FIGURES 1 and 4, a platform 32 is provided on the base 14 to one side of the housing 12. A double ended motor 36 is provided on the platform 32. One end of the motor 36 is connected to a rapid rotary mixing pump 34. A means is provided for introducing chlorine into the inlet side of the pump 34. In the illustrated embodiment, a tank 38 containing chlorine gas is supported on the platform 32 for this purpose.

Raw liquids such as the liquids normally discharged into the sewer system from a laundromat, laundry, car wash, etc. are introduced into the inlet side of the rotary mixing pump 34 by way of conduit 40. The outlet side of pump 34 communicates with the upflow clarifier by way of conduit 42. Conduit 42 terminates within the chamber 24 by way of an upstanding end portion 44 whose outlet port is spaced from and adjacent to the base 28 of the cup-shaped member 26.

The annular sludge collection chamber defined by the outer peripheral surface of the clarifier 18 and the inner peripheral surface of the housing 12 is designated as 46. Bottom wall 16 of the housing 12 serves as a bottom for the chamber 46. The upper end of chamber 46 is in communication with atmosphere since there is no top wall. A plurality of vessels 48, 50 and 52 are provided within chamber 46.

Vessel 48 is adapted to contain a pH correction chemical. Vessel 50 is adapted to contain a coagulant such as alum. Vessel 52 is made from a porous material such as Vyon. Vyon is a rigid porous polymeric plastic material capable of filtering out impurities having particle sizes greater than 25 microns. In order to provide sufficient rigidity for the vessel 52, it is provided with a metal perforated liner 54.

A conduit 56 provides communication between the interior of vessel 48 and the inlet side of pump 34. A conduit 58 provides communication between the interior of vessel 50 and the inlet side of pump 34. A conduit 60 provides communication between the interior of vessel 52 and the inlet side of pump 34.

A means is provided to positively define the upper limit of a floc blanket within the upflow clarifier 18. Thus, a porous substrate 62 reinforced on its upper surface with a metal screen 64 is supported within the clarifier 18 and spaced from the upper edge thereof. Substrate 62 may be made from a wide variety of materials. I prefer to use a rigid polymeric plastic material which is porous and capable of filtering out particles having a size of greater than 25 microns and sold commercially as Vyon. The lower surface of substrate 62 is preferably a smooth surface for quick release of the floc blanket 66 during back flow. A chamber 70 is provided in the upflow clarifier 18 above the screen 64. For many commercial establishments such as laundries or car washes, the purified liquid present in chamber 70 may be recycled back into the system for use and thereby constitute the effluent. The effluent in chamber 70 will have had its turbidity reduced from 300 parts per million to 3 parts per million and its ABS (alkyl benzene sulfonate) reduced from 15 parts per million to .1 part per million. It should be noted that the effluent in chamber 70 may be consumed as drinking water since acceptable turbidity for drinking water is less than 10 parts per million.

The upper portion of the upflow clarifier 18 below substrate 62 is in communication with the lower portion of the sludge collection chamber 46 by way of conduit 68. Conduit 68 provides continuous communication between the clarifier 18 and chamber 46.

If it is desired to further purify the effluent in chamber 70, additional filtering may be provided. Such additional filtering may be required due to the high concentrations of impurities in the raw liquids delivered to the apparatus 10 by way of conduit 40 or due to the requirement of highly purified liquids for the system with which the apparatus 10 is to be associated. Such additional filtering may be accomplished by providing an open tray 72 in the upflow clarifier 18 above screen 64. A plurality of holes or notches are provided on the upper edge of tray 72 to facilitate entry of the effluent from chamber 70 to the tray 72. A plurality of brackets 74 extend over the upper edges of housing 12 and clarifier 18 to the closed end of collection tubes 76. Collection tubes 76 may have one end adjacent the bracket 74 closed by flattening the same. The flattened ends of the tubes 76 are integrally connected to the brackets and thereby facilitate supporting the tray 72.

As shown more clearly in FIGURE 3, the collection tubes 76 extend radially outwardly like spokes from a manifold 78. A plurality of filter tubes 80 extend between adjacent collection tubes 76. Filter tubes 80 are hollow tubes made from a porous filtering material such as Vyon. As shown more clearly in FIGURE 7, the ends of the tubes 80 communicate with the interior of hollow collection tubes 76. Additional filtering action is provided by filling the remainder of the tray 72 with charcoal 82 so that it overlies the collection tubes 76 and the filter tubes 80.

The filtered effluent is removed from the manifold 78 by way of an effluent discharge conduit 84 having a valve 86 therein. One leg of the T 88 is provided. One leg of the T 88 is connected to the manifold 78. Another leg of the T 88 is connected to one end of the conduit 84. The remaining leg of the T 88 is connected to one end of a backwash conduit 90 having a valve 92 therein.

As shown more clearly in FIGURES 1 and 4, the end of conduit 84 remote from T 88 is connected to the inlet side of a pump 94. Pump 94 is driven by the other side of the motor 36. A conduit 96 is provided in communication with the outlet side of pump 34 for transporting the effluent to the desired location. Since conduit 84 is connected to the inlet side of pump 94, the filtering action in tray 72 is a vacuum filtering action.

To facilitate backwashing and draining of the tray 72, a valved drain conduit 98 is provided. Conduit 98 provides communication from the bottom of tray 72 to the interior of chamber 46. A drain conduit 100 provides communication between the chamber 24 and a conduit 104. A drain conduit 102 provides communication between the bottom of chamber 46 and conduit 104. Each of the conduits 100 and 102 are provided with manual valves for controlling flow of drainage.

The operation of the system is as follows:

It will be asumed that the raw liquid supplied by conduit 40 contains turbidity in an amount of about 300 parts per million, ABS in an amount of about 15 parts per million, settleable solids, colloidal suspensions, phosphates, BOD (biochemical oxygen demand) and COD (chemical oxygen demand). A suitable pH correction chemical will be provided in vessel 48 which is preferably made from a plastic material. When commencing operation, vessel 52 will be empty. Suitable metering valves may be provided in conduits 56, 58 and 60 to control the rate of flow therethrough. It is preferable to have the initial charge of the alum to be in sufficient quantities so as to form a floc blanket having a thickness of about one inch. This may be accomplished by having twelve pounds of alum mixed with the first five gallons of water which is introduced into the upflow clarifier 18.

The pH correction chemical from conduit 56, the alum from conduit 58 and any clarified liquid from conduit 66 together with chlorine gas from tank 38 are intimately mixed with the raw water supplied by conduit 40 when passing through the rotary pump 34. This mixture is delivered by way of conduit 42 to the diffusion chamber 24. Further mixing occurs in chamber 24. The mixture then passes upwardly between the baffles 30 which prevent uneven distribution and the formation of a vortex.

The floc blanket 66 extends across the clarifier 18 and rises up to the level of the substrate 62. Particles having a size less than 25 microns are filtered out by the floc blanket 66. Impurities having a particle size greater than 25 microns are filtered out by the substrate 62. In chamber 70, the effluent will have a turbidity of about three parts per million (as compared with in initial 300 p.p.m.) and an ABS of about .1 part per million (as compared with an initial 15 p.p.m.). Any other impurities such as the settleable solids and colloidal suspensions will have been filtered out by the floc blanket and the substrate 62. BOD and COD are substantially reduced.

As the process continues, the thickness of the floc blanket will increase until it approaches the base 28. At the same time, the floc blanket overflows through conduit 68 into the sludge collection chamber 46. Any colloidal water which overflows through conduit 68 into the sludge chamber 46 will be on the upper surface of the sludge and can filter into vessel 52 for recycling.

The effluent in chamber 70 may be immediately returned to the process. If further filtering is desired, the tray 72 will be present and the effluent in chamber 70 will rise until it overflows into the tray 72. Within tray 72, effluent will be filtered by the charcoal 82 and the filter tubes 80. The effluent which is filtered through the walls of tubes 80 will collect in the collection tubes 76 and delivered to the manifold 78. The manifold 78 and the tubes 76 are connected to the suction side of pump 94 by way of conduit 84. Hence, the filtering action in tray 72 is a vacuum filter operation. During this process, it will have been obvious to those skilled in the art that valve 92 as well as the valves in conduits 98, 100 and 102 are closed while valve 86 is open. The effluent is pumped by pump 94 through conduit 96 to the desired location.

In a system 10 having a height of approximately six feet and a diameter for the housing 12 of about six feet with the diameter of the upflow clarifier 18 being approximately four feet, 1500 gallons can be processed in eight hours. After operation for approximately sixty days, it will be necessary to shut down the apparatus 10 to clean out the sludge chamber 46 and backwash the filters in tray 72 as well as substrate 62. The sludge within chamber 46 may be dipped through the open top thereof. After the dipping operation, there will be some sludge left over on the bottom wall 16. The valve 86 will be closed as well as the valves in conduits 100 and 102. The valve in conduit 98 will be opened as well as valve 92. Backwash liquid from conduit 90 will drain from tray 72 into chamber 46. Thereafter, the valves in conduits 100 and 102 may be opened and the remainder of any sludge within chamber 46 may be flushed out by spraying from a hose into the chamber 46 as well as the clarifier 18. The smooth surface on the porous substrate 62 provides for rapid separation of the floc blanket 66 therefrom. The clarifier 18 is more readily cleaned and the substrate 62 backwashed by removing the tray 72. Such removal of tray 72 is readily facilitated by means of a coupling 106 in the conduit 84. When coupling 106 is separated, the tray 72 together with its filters, collection pipes, and bracket 74 may be raised vertically. By using simple hold-down brackets and bolts, the substrate 62 and its back-up screen 64 are rapidly removed.

It is to be noted that the apparatus 10 is ready for installation in almost any location where there is provided a conduit 40 for supplying the raw liquid, and a conduit 90 for water supply used in backwash processing. No expensive supports, underground locations, or the like are required. If desired, the entire apparatus 10 may be mounted on a vehicle for ease of mobility for movement from one area to another.

When the apparatus 10 is utilized in conjunction with commercial establishments such as a laundromat, the liquid delivered through conduit 40 is the liquid which normally would have been discharged into the sewer. The effluent delivered by conduit 96 is connected to the supply line for fresh water incoming to the laundromat. The amount of water utilized by the laundromat is less than one-half of that normally utilized because water normally discharged into the sewer is reprocessed and fed back to the line containing incoming water. Thus, the amount of incoming water utilized by the laundromat is substantially reduced. In isolated areas where saline conversion equipment is utilized to convert salt water into potable drinking water, the size of such equipment may be substantially reduced by supplementing the same with apparatus 10 to reclaim nonsaline waste water.

The chemical most generally used for coagulation is alum (aluminum sulfate). Other salts such as ferric chloride or ferric sulfate may be used. Lime may be used alone or in conjunction with ferrous sulfate as is well known to those skilled in the art.

The present invention may be embodied in other specific forms without departing from the spirit or essential attributes thereof and, accordingly, reference should be made to the appended claims, rather than to the foregoing specification as indicating the scope of the invention.

I claim:

1. Water treating apparatus comprising an upflow clarifier, a diffusion chamber within a bottom portion of said clarifier for receiving water to be treated therein, porous limit means within said clarifier defining a positive upper limit for a floc blanket, a conduit for treating the effluent which passes through the limit means away from the clarifier, an outer housing around said clarifier with a sludge collection chamber therebetween, means providing communication between the sludge collection chamber and the clarifier at a location adjacent but below the limit means, and means for continuously removing clarified water from said sludge collection chamber.

2. Water treating apparatus in accordance with claim 1 wherein said limit means is a porous substrate for filtering out large particles in the water, and means for supporting the substrate within said clarifier.

3. Water treating apparatus in accordance with claim 2 including filter means above said substrate through which the water may flow under a suction effected by a pump connected to said conduit.

4. Water treating apparatus in accordance with claim 1 including conduit means for introducing water to be treated into said diffusion chamber, means for introducing a pH correction chemical into said conduit means, means for introducing coagulant into said conduit means, and means for introducing the removed clarified water into said conduit means.

5. Water treating apparatus in accordance with claim 4 including a rotary mixing pump in said conduit means and positioned so that the pH correction chemical and the coagulant as well as the clarified water pass through the pump.

6. Water treating apparatus in accordance with claim 4 wherein a vessel for the pH correction chemical is located in said sludge chamber, a vessel for the coagulant being located in the sludge chamber, and a porous vessel for the clarified water being located in said sludge chamber.

7. Water treating apparatus comprising an open top upflow clarifier, a diffusion chamber in a bottom portion of said clarifier for receiving water to be treated therein, means for preventing a floc blanket from rising beyond a predetermined level in said clarifier, a collection chamber at least partially surrounding said clarifier, a conduit for collecting and transmitting effluent from the upper end of said clarifier, conduit means for introducing water to be treated into said diffusion chamber, means for introducing a pH correction chemical into said conduit means, means for introducing a coagulant into said conduit means, and a mixing pump positioned so that the chemical and coagulant pass through the pump to the diffusion chamber by way of said conduit means.

8. Apparatus in accordance with claim 7 including a valve drain conduit having one end communicating with the bottom of the diffusion chamber.

9. A method of treating water comprising the steps of mixing a coagulant and a pH correction chemical with water to be treated, delivering the mixture to the bottom of an upflow clarifier, filtering and purifying the mixture by causing it to flow upwardly through a floc blanket extending across the clarifier, removing filtered water from the clarifier at a location above the floc blanket, preventing the floc blanket from being upset and removed along with the water, filtering the mixture at a location above the floc blanket, providing a sludge collection chamber around the clarifier, collecting sludge and clarified water in said sludge chamber, and recycling any clarified water in such sludge chamber by remixing it with water to be treated in said clarifier.

10. A method of treating water in accordance with claim 9 including filtering said clarified water before it is mixed with water to be treated.

11. A method of treating water in accordance with claim 9 wherein said mixing is accomplished in a rotary mixing pump which causes the pH correction chemical and the coagulant to be removed from vessels for the same before they are introduced to the water to be treated.

12. A method of treating water in accordance with claim 9 including delivering said mixture into said clarifier by using a rotary mixing pump, and recycling said clarified water by introducing the same to the water to be treated on the inlet side of said pump.

References Cited

UNITED STATES PATENTS

| 653,010 | 7/1900 | Koyl | 210—205 X |
| 1,195,537 | 8/1916 | Van Vloten | 210—207 |
| 2,365,293 | 12/1944 | Robinson | 210—20 X |
| 3,313,725 | 4/1967 | Koh Tsuda et al. | 210—20 |
| 819,885 | 5/1906 | Holmen | 210—202 X |

FOREIGN PATENTS

| 10,157 | 1898 | Great Britain. |
| 6,946 | 1904 | Great Britain. |

MICHAEL E. ROGERS, *Primary Examiner.*

U.S. Cl. X.R.

210—60, 196, 202, 256, 261, 311